United States Patent [19]

Kamijima et al.

[11] Patent Number: 5,439,512
[45] Date of Patent: Aug. 8, 1995

[54] RESIN COMPOSITION AND ANTIFOULING PAINT

[75] Inventors: Koichi Kamijima; Seiji Tai, both of Hitachi; Hiroyuki Tanaka, Mito, all of Japan

[73] Assignee: Hitachi Chemical Company, Ltd., Tokyo, Japan

[21] Appl. No.: 180,359

[22] Filed: Jan. 12, 1994

[30] Foreign Application Priority Data

| Jan. 21, 1993 | [JP] | Japan | 5-008005 |
| Apr. 7, 1993 | [JP] | Japan | 5-079943 |
| Apr. 7, 1993 | [JP] | Japan | 5-079945 |
| Apr. 8, 1993 | [JP] | Japan | 5-081004 |
| Apr. 13, 1993 | [JP] | Japan | 5-085026 |
| Apr. 13, 1993 | [JP] | Japan | 5-085027 |
| Oct. 5, 1993 | [JP] | Japan | 5-248387 |
| Nov. 25, 1993 | [JP] | Japan | 5-294819 |

[51] Int. Cl.$^6$ ............................................. C09D 5/14
[52] U.S. Cl. .................... 106/18.32; 106/18.31; 106/18.33; 106/18.34; 106/18.35; 424/78.09; 424/405; 424/630; 424/632; 424/635; 424/637; 424/638; 514/183; 514/222.2; 514/359; 514/361; 514/499; 514/500; 514/724; 523/122
[58] Field of Search ............... 106/15.05, 18.32, 18.33, 106/18.31, 18.34, 18.35; 523/122; 514/499, 500, 183, 222.2, 359, 361, 724; 424/78.09, 405, 630, 632, 635, 637, 638

[56] References Cited

U.S. PATENT DOCUMENTS

4,654,380 3/1987 Makepiece .................. 106/18.32

FOREIGN PATENT DOCUMENTS

| 0003749 | 9/1979 | European Pat. Off. . |
| 0327021 | 8/1989 | European Pat. Off. . |
| 0364271 | 4/1990 | European Pat. Off. . |
| 0485213 | 5/1992 | European Pat. Off. . |
| 0529693 | 3/1993 | European Pat. Off. . |
| 2062614 | 12/1970 | Germany .................. 106/18.32 |
| 51-124130 | 10/1976 | Japan . |
| 57-092061 | 6/1982 | Japan . |
| 2099567 | 4/1990 | Japan . |
| 86/02660 | 5/1986 | WIPO . |

*Primary Examiner*—Anthony Green
*Attorney, Agent, or Firm*—Antonelli, Terry, Stout & Kraus

[57] ABSTRACT

A coating varnish composition comprising (A) a polymer obtained by polymerizing one or more unsaturated carboxylic acids (a) with one or more unsaturated monomers (b), and (B) at least one additive selected from triazole derivatives, thiadiazole derivatives, and benzothiazole derivatives, and an antifouling coating composition comprising (i) said coating varnish and (ii) an antifouling agent containing a copper compound as a major component, do not show a danger of organotin copolymers, but provide a coating excellent in coating consuming properties and antifouling properties for a long period of time without causing gelation when mixed with a copper compound.

11 Claims, No Drawings

RESIN COMPOSITION AND ANTIFOULING PAINT

BACKGROUND OF THE INVENTION

This invention relates to a coating varnish composition and an antifouling coating composition to be used for preventing attachment of marine organisms to the underwater or submarine structures such as ships, fishing nets, drainage conduits, etc.

Numerous species of marine organisms, such as barnacle, ascidian, serpula, mussel, laver, etc., live in the seawater. When a structure such as a ship, fishing net, drainage pipe, etc., is set or placed in commission in or on the sea, the marine organisms cling to the structure and grow to give various kinds of damage to the structure. For instance, if the ship's bottom is incrusted with marine organisms, the frictional resistance of the seawater increases to cause a reduction of cruising performance of the ship, so that if it is tried to keep a constant cruising speed of the ship, its fuel consumption increases to pose a serious economical problem. Also, if the marine organisms cling to the fishing nets used for ocean culture, the meshes of the nets would be clogged up, which could prove fatal to the cultured fishes and shellfishes.

Hitherto, in order to prevent attachment of the marine organisms to the underwater structures such as mentioned above, antifouling paints using homopolymers or copolymers of organotin-containing unsaturated monomers as resinous component (see Japanese Patent Examined Publication (JP-B) Nos. 40-21426, 44-9579, 46-13392, 49-20491, 51-11647, 51-12049, 52-48170, etc.) have been applied to said structures. These polymers have their organotin portion hydrolyzed with the seawater (pH: 8.0–8.3). As a result, not only the organotin serves as an antifouling agent, but also the polymer surface which has been made soluble in seawater is gradually corroded by the moving seawater to bare out the new coating surface, thus producing a long-lasting stabilized antifouling effect. However, the organotin released into the seawater from the paints is hard to decompose and may be taken in by and accumulated in marine organisms and, through the food chain, it may get into the human system. This involves the possibility of causing serious physical trouble such as deformity. So, use of dangerous organotin in the antifouling paints has been banned.

Request is now voiced in the art for the development of a resin for antifouling paints which are capable of producing a long-lasting stabilized antifouling effect, in place of the highly dangerous organotin-based resins. Ideally speaking, it is desirable that the resins used for antifouling paints are of a hydrolyzable type like the organotin-based resins, but proposals involving use of hydrophilic or water-repellent resins have also been made (Japanese Patent Unexamined Publication (JP-A) Nos. 62-290768, 62-13471, 58-180565, 57-67672, etc.). However, it is hardly possible to realize a long-lasting stabilized antifouling effect by use of a resin having the hydrophilic or water-repellent property alone.

In view of the above, various hydrolyzable resins having a specific carboxylic acid ester in the side chain have been proposed (WO 84/02915, JP-A Nos. H2-69576, 63-215780, 62-57464, JP-B Nos. 55-39271, 61-3830, etc.), but their effect has not been well satisfactory.

On the other hand, JP-A Nos. 51-124130, 62-135575 and 62-501293 propose to use copolymers having free carboxylic acid groups for this purpose. These copolymers have no toxicity different from the organotin based resins and can be expected to be excellent in coating consuming properties. But when these copolymers are used in antifouling paints, there is a fatal defect in that a thickening-gelation is brought about when these copolymers are mixed with copper compounds which are used now as a toxicant.

Another approach is to use a polymer having triorganotin groups together with a triazole derivative (JP-A 57-92061). Such a composition is expected to suppress the problem of thickening-gelation to some extent, but in fact, the addition of triazole derivative does not give a much effect, resulting in failing to give a good coating composition and a good coating.

SUMMARY OF THE INVENTION

It is an object of the present invention to provide a coating varnish composition and an antifouling coating composition, which have no danger as the organotin copolymer, but have good coating consuming properties equal to the organotin copolymers, and are able to form a coating capable of maintaining excellent antifouling properties for a long period of time and to form an excellent coating causing no gelation even if kneaded with a copper compound.

The present invention provides a coating varnish composition comprising
(A) a polymer obtained by polymerizing (a) one or more unsaturated carboxylic acids, and (b) one or more unsaturated monomers copolymerizable with the component (a), and
(B) at least one additive selected from the group consisting of triazole derivatives, thiadiazole derivatives and benzothiazole derivatives.

The present invention also provides an antifouling coating composition comprising
(i) a coating varnish composition mentioned above, and
(ii) an antifouling agent containing a copper compound as a major component.

DESCRIPTION OF THE PREFERRED EMBODIMENTS

The present inventors have earnestly studied to solve the prior art problems of using organotin-based resins and to develop an antifouling paint excellent in properties for preventing adhesion of marine organisms without any danger, and accomplished the present invention.

The coating varnish composition of the present invention comprises
(A) a polymer obtained by polymerizing (a) one or more unsaturated carboxylic acids, and (b) one or more unsaturated monomers copolymerizable with the component (a), and
(B) at least one additive selected from the group consisting of triazole derivatives, thiadiazole derivatives and benzothiazole derivatives.

As the unsaturated carboxylic acid (a), there can be used those having one or more free carboxyl groups, for example, acrylic acid, methacrylic acid, crotonic acid, cinnamic acid, maleic acid, fumaric acid, itaconic acid, etc. Further, it is possible to use a monoester of dicarboxylic acid. Among them, the use of acrylic acid and methacrylic acid is preferable due to their high effects.

These unsaturated acids can be used singly or as a mixture thereof.

The unsaturated carboxylic acid (a) is preferably used in an amount of 1 to 99% by mole, more preferably 10 to 95% by mole, based on the total amounts of the monomers. When the amount is less than 1% by mole, it becomes difficult to obtain the resin showing sufficient coating consuming properties. On the other hand, when the amount is more than 99% by mole, there is a tendency to give undesirable influences on paint film stability.

As the unsaturated monomer (b) copolymerizable with the unsaturated carboxylic acid (a), it is preferable to use an unsaturated monomer of the formula:

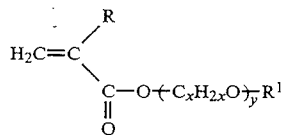

wherein R is a hydrogen atom or a methyl group; x is an integer of 1 to 6; y is an integer of 1 to 100; and $R^1$ is a hydrogen atom, a straight, branched or cyclic alkyl group, an aryl group or an aralkyl group, from the viewpoint of further improving properties such as hydrolyzable properties.

Concrete examples of the straight, branched or cyclic alkyl group, the aryl group and the aralkyl group in the definition of $R^1$ in the formula (I) are methyl, ethyl, propyl, isopropyl, butyl, isobutyl, sec-butyl, tert-butyl, pentyl, sec-pentyl, tert-pentyl, neopentyl, 2-ethylhexyl, cyclopropyl, cyclobutyl, cyclopentyl, cyclohexyl; phenyl, o-tolyl, m-tolyl, p-tolyl, 2,3-xylyl, 2,4-xylyl, o-cumenyl, m-cumenyl, p-cumenyl, mesityl, benzyl, phenetyl, tolyl, naphthyl, norbornyl, etc.

The unsaturated monomer of the formula (I) can be produced by convention processes. It is possible to use the commercially available unsaturated monomers of the formula (I).

Preferable examples of the unsaturated monomer of the formula (I) are as follows.

Illustrated Compound No.

(1) $CH_2=C(R)COOCH_2CH_2OCH_3$
(2) $CH_2=C(R)COO(CH_2CH_2O)_2CH_3$
(3) $CH_2=C(R)COO(CH_2CH_2O)_3CH_3$
(4) $CH_2=C(R)COO(CH_2CH_2O)_4CH_3$
(5) $CH_2=C(R)COO(CH_2CH_2O)_5CH_3$
(6) $CH_2=C(R)COO(CH_2CH_2O)_6CH_3$
(7) $CH_2=C(R)COO(CH_2CH_2O)_7CH_3$
(8) $CH_2=C(R)COO(CH_2CH_2O)_8CH_3$
(9) $CH_2=C(R)COO(CH_2CH_2O)_9CH_3$
(10) $CH_2=C(R)COO(CH_2CH_2O)_{10}CH_3$
(11) $CH_2=C(R)COO(CH_2CH_2O)_{12}CH_3$
(12) $CH_2=C(R)COO(CH_2CH_2O)_{14}CH_3$
(13) $CH_2=C(R)COO(CH_2CH_2O)_{16}CH_3$
(14) $CH_2=C(R)COO(CH_2CH_2O)_{18}CH_3$
(15) $CH_2=C(R)COO(CH_2CH_2O)_{20}CH_3$
(16) $CH_2=C(R)COO(C_3H_6O)CH_3$
(17) $CH_2=C(R)COO(C_3H_6O)_2CH_3$
(18) $CH_2=C(R)COO(C_3H_6O)_4CH_3$
(19) $CH_2=C(R)COO(C_3H_6O)_6CH_3$
(20) $CH_2=C(R)COO(C_3H_6O)_8CH_3$
(21) $CH_2=C(R)COO(C_3H_6O)_{10}CH_3$
(22) $CH_2=C(R)COO(C_4H_8O)CH_3$
(23) $CH_2=C(R)COO(C_4H_8O)_2CH_3$
(24) $CH_2=C(R)COO(CH_2CH_2O)_2C_6H_{11}$
(25) $CH_2=C(R)COO(CH_2CH_2O)_2C_6H_5$
(26) $CH_2=C(R)COOCH_2OH$
(27) $CH_2=C(R)COOCH_2CH_2OH$
(28) $CH_2=C(R)COOC_3H_6OH$
(29) $CH_2=C(R)COOC_4H_8OH$
(30) $CH_2=C(R)COOC_5H_{10}OH$
(31) $CH_2=C(R)COOC_6H_{12}OH$
(32) $CH_2=C(R)COO(C_5H_{10}O)_3H$
(33) $CH_2=C(R)COO(C_5H_{10}O)_4H$
(34) $CH_2=C(R)COO(C_5H_{10}O)_5H$
(35) $CH_2=C(R)COO(C_5H_{10}O)_6H$
(36) $CH_2=C(R)COO(C_6H_{12}O)_2H$
(37) $CH_2=C(R)COO(C_6H_{12}O)_3H$
(38) $CH_2=C(R)COO(C_6H_{12}O)_4H$
(39) $CH_2=C(R)COO(C_6H_{12}O)_5H$
(40) $CH_2=C(R)COO(C_6H_{12}O)_6H$
(41) $CH_2=C(R)COOCH_2CH_2OC_2H_5$
(42) $CH_2=C(R)COO(CH_2CH_2O)_2C_2H_5$
(43) $CH_2=C(R)COO(CH_2CH_2O)_3C_2H_5$
(44) $CH_2=C(R)COO(CH_2CH_2O)_4C_2H_5$
(45) $CH_2=C(R)COO(CH_2CH_2O)_5C_2H_5$
(46) $CH_2=C(R)COO(CH_2CH_2O)_6C_2H_5$
(47) $CH_2=C(R)COO(CH_2CH_2O)_7C_2H_5$
(48) $CH_2=C(R)COO(CH_2CH_2O)_8C_2H_5$
(49) $CH_2=C(R)COO(CH_2CH_2O)_9C_2H_5$
(50) $CH_2=C(R)COO(CH_2CH_2O)_{10}C_2H_5$
(51) $CH_2=C(R)COO(CH_2CH_2O)_{12}C_2H_5$
(52) $CH_2=C(R)COO(CH_2CH_2O)_{14}C_2H_5$
(53) $CH_2=C(R)COO(CH_2CH_2O)_{16}C_2H_5$
(54) $CH_2=C(R)COO(CH_2CH_2O)_{18}C_2H_5$
(55) $CH_2=C(R)COO(CH_2CH_2O)_{20}C_2H_5$
(56) $CH_2=C(R)COO(C_3H_6O)C_2H_5$
(57) $CH_2=C(R)COO(C_3H_6O)_2C_2H_5$
(58) $CH_2=C(R)COO(C_3H_6O)_4C_2H_5$
(59) $CH_2=C(R)COO(C_3H_6O)_6C_2H_5$
(60) $CH_2=C(R)COO(C_3H_6O)_8C_2H_5$
(61) $CH_2=C(R)COO(C_3H_6O)_{10}C_2H_5$
(62) $CH_2=C(R)COO(C_4H_8O)C_2H_5$
(63) $CH_2=C(R)COO(C_4H_8O)_2C_2H_5$
(64) $CH_2=C(R)COO(C_4H_8O)_3C_2H_5$
(65) $CH_2=C(R)COO(C_4H_8O)_4C_2H_5$
(66) $CH_2=C(R)COOCH_2CH_2OC_3H_7$
(67) $CH_2=C(R)COO(CH_2CH_2O)_2C_3H_7$
(68) $CH_2=C(R)COO(CH_2CH_2O)_3C_3H_7$
(69) $CH_2=C(R)COO(CH_2CH_2O)_4C_3H_7$
(70) $CH_2=C(R)COO(CH_2CH_2O)_5C_3H_7$
(71) $CH_2=C(R)COO(CH_2CH_2O)_6C_3H_7$
(72) $CH_2=C(R)COO(CH_2CH_2O)_7C_3H_7$
(73) $CH_2=C(R)COO(CH_2CH_2O)_8C_3H_7$
(74) $CH_2=C(R)COO(CH_2CH_2O)_9C_3H_7$
(75) $CH_2=C(R)COO(CH_2CH_2O)_{10}C_3H_7$
(76) $CH_2=C(R)COO(CH_2CH_2O)_{12}C_3H_7$
(77) $CH_2=C(R)COO(CH_2CH_2O)_{14}C_3H_7$
(78) $CH_2=C(R)COO(CH_2CH_2O)_{16}C_3H_7$
(79) $CH_2=C(R)COO(CH_2CH_2O)_{18}C_3H_7$
(80) $CH_2=C(R)COO(CH_2CH_2O)_{20}C_3H_7$
(81) $CH_2=C(R)COO(C_3H_6O)C_3H_7$
(82) $CH_2=C(R)COO(C_3H_6O)_2C_3H_7$
(83) $CH_2=C(R)COO(C_3H_6O)_4C_3H_7$

(84) $CH_2=C(R)COO(C_3H_6O)_6C_3H_7$
(85) $CH_2=C(R)COO(C_3H_6O)_8C_3H_7$
(86) $CH_2=C(R)COO(C_3H_6O)_{10}C_3H_7$
(87) $CH_2=C(R)COO(C_4H_8O)C_3H_7$
(88) $CH_2=C(R)COO(C_4H_8O)_2C_3H_7$
(89) $CH_2=C(R)COO(C_4H_8O)_3C_3H_7$
(90) $CH_2=C(R)COO(C_4H_8O)_4C_3H_7$
(91) $CH_2=C(R)COOCH_2CH_2OC_4H_9$
(92) $CH_2=C(R)COO(CH_2CH_2O)_2C_4H_9$
(93) $CH_2=C(R)COO(CH_2CH_2O)_3C_4H_9$
(94) $CH_2=C(R)COO(CH_2CH_2O)_4C_4H_9$
(95) $CH_2=C(R)COO(CH_2CH_2O)_5C_4H_9$
(96) $CH_2=C(R)COO(CH_2CH_2O)_6C_4H_9$
(97) $CH_2=C(R)COO(CH_2CH_2O)_7C_4H_9$
(98) $CH_2=C(R)COO(CH_2CH_2O)_8C_4H_9$
(99) $CH_2=C(R)COO(CH_2CH_2O)_9C_4H_9$
(100) $CH_2=C(R)COO(CH_2CH_2O)_{10}C_4H_9$
(101) $CH_2=C(R)COO(CH_2CH_2O)_{12}C_4H_9$
(102) $CH_2=C(R)COO(CH_2CH_2O)_{14}C_4H_9$
(103) $CH_2=C(R)COO(CH_2CH_2O)_{16}C_4H_9$
(104) $CH_2=C(R)COO(CH_2CH_2O)_{18}C_4H_9$
(105) $CH_2=C(R)COO(CH_2CH_2O)_{20}C_4H_9$
(106) $CH_2=C(R)COO(C_3H_6O)C_4H_9$
(107) $CH_2=C(R)COO(C_3H_6O)_2C_4H_9$
(108) $CH_2=C(R)COO(C_3H_6O)_4C_4H_9$
(109) $CH_2=C(R)COO(C_3H_6O)_6C_4H_9$
(110) $CH_2=C(R)COO(C_3H_6O)_8C_4H_9$
(111) $CH_2=C(R)COO(C_3H_6O)_{10}C_4H_9$
(112) $CH_2=C(R)COO(C_4H_8O)C_4H_9$
(113) $CH_2=C(R)COO(C_4H_8O)_2C_4H_9$
(114) $CH_2=C(R)COO(C_4H_8O)_3C_4H_9$
(115) $CH_2=C(R)COO(C_4H_8O)_4C_4H_9$
(116) $CH_2=C(R)COO(CH_2CH_2O)_2H$
(117) $CH_2=C(R)COO(CH_2CH_2O)_3H$
(118) $CH_2=C(R)COO(CH_2CH_2O)_4H$
(119) $CH_2=C(R)COO(CH_2CH_2O)_5H$
(120) $CH_2=C(R)COO(CH_2CH_2O)_6H$
(121) $CH_2=C(R)COO(CH_2CH_2O)_7H$
(122) $CH_2=C(R)COO(CH_2CH_2O)_8H$
(123) $CH_2=C(R)COO(CH_2CH_2O)_9H$
(124) $CH_2=C(R)COO(CH_2CH_2O)_{10}H$
(125) $CH_2=C(R)COO(CH_2CH_2O)_{12}H$
(126) $CH_2=C(R)COO(CH_2CH_2O)_{14}H$
(127) $CH_2=C(R)COO(CH_2CH_2O)_{16}H$
(128) $CH_2=C(R)COO(CH_2CH_2O)_{18}H$
(129) $CH_2=C(R)COO(CH_2CH_2O)_{20}H$
(130) $CH_2=C(R)COO(C_3H_6O)H$
(131) $CH_2=C(R)COO(C_3H_6O)_2H$
(132) $CH_2=C(R)COO(C_3H_6O)_4H$
(133) $CH_2=C(R)COO(C_3H_6O)_6H$
(134) $CH_2=C(R)COO(C_3H_6P)_8H$
(135) $CH_2=C(R)COO(C_3H_6O)_{10}H$
(136) $CH_2=C(R)COO(C_4H_8O)H$
(137) $CH_2=C(R)COO(C_4H_8O)_2H$
(138) $CH_2=C(R)COO(C_4H_8O)_3H$
(139) $CH_2=C(R)COO(C_4H_8O)_4H$

The unsaturated monomer of the formula (I) is preferably used in an amount of 0.1 to 20% by mole, more preferably 0.2 to 15% by mole, based on the total amounts of the monomers. When the amount is less than 0.1% by mole, the effect of addition hardly appears, whereas when the amount is more than 20% by mole, there is a tendency to lower paint film stability.

The unsaturated monomers of the formula (I) can be used singly or as a mixture thereof.

As the unsaturated monomers (b) other than those of the formula (I), there can be used the following unsaturated monomers.

Esters of monocarboxylic acids:

As the monocarboxylic acids, there can be used acrylic acid, methacrylic acid, crotonic acid, cinnamic acid, etc.

As the ester moieties, there can be used methyl esters, ethyl esters, n-propyl esters, isopropyl esters, n-butyl esters, isobutyl esters, sec-butyl esters, tert-butyl esters, 2-ethylhexyl esters, octyl esters, nonyl esters, decyl esters, undecyl esters, dodecyl esters, tridecyl esters, tetradecyl esters, pentadecyl esters, hexadecyl esters, heptadecyl esters, octadecyl esters, nonadecyl esters, eicosyl esters, heneicosyl esters, docosyl esters, cyclohexyl esters, benzyl esters, phenyl esters, dimethylaminoethyl esters, dimethylaminopropyl esters, 2-chloroethyl esters, 2,2,2-trichloroethyl esters, 2-fluoroethyl esters, 2,2,2-trifluoroethyl esters, 2-cyanoethyl esters, trimethylsilyl esters, triethylsilyl esters, tripropylsilyl esters, tributylsilyl esters, trihexylsilyl esters, trimethoxysilyl esters, triethoxysilyl esters, tripropoxysilyl esters, tributoxysilyl esters, trihexyoxylsilyl esters, triphenylsilyl esters, triphenoxysilyl esters, etc.

Diesters of dicarboxylic acids:

As the dicarboxylic acids, there can be used maleic acid, fumalic acid, itaconic acid, citraconic acid, etc.

As the diester moieties, there can be used dimethyl esters, diethyl esters, di-n-propyl esters, diisopropyl esters, di-n-butyl esters, diisobutyl esters, di-sec-butyl esters, di-tert-butyl esters, di-2-ethylhexyl esters, dioctyl esters, dinonyl esters, didecyl esters, diundecyl esters, didodecyl esters, ditridecyl esters, ditetradecyl esters, dipentadecyl esters, dihexadecyl esters, diheptadecyl esters, dioctadecyl esters, dinonadecyl esters, dieicosyl esters, diheneicosyl esters, didocosyl esters, dicyclohexyl esters, dibenzyl esters, diphenyl esters, didimethylaminoethyl esters, didimethylaminopropyl esters, di-2-chloroethyl esters, di-2,2,2-trichloroethyl esters, di-2-fluoroethyl esters, di-2,2,2-trifluoroethyl esters, di-2-cyanoethyl esters, ditrimethylsilyl esters, ditriethylsilyl esters, ditripropylsilyl esters, ditributylsilyl esters, ditrihexylsilyl esters, ditrimethoxysilyl esters, ditriethoxysilyl esters, ditripropoxysilyl esters, ditributoxysilyl esters, ditrihexyloxysilyl esters, ditriphenylsilyl esters, ditriphenoxysilyl esters, etc.

Aromatic vinyl monomers:

styrene, α-methylstyrene, p-t-butylstyrene, p-chlorostyrene, o-methoxystyrene, p-methoxystyrene, vinyltoluene, etc.

Allyl monomers:

allyl acetate, diallyl alcohol, diallylamine, allylbenzene, o-allylphenol, allyl dibromide, allyl dichloride, allyl dimethacrylate, allyl diacrylate, allyl di-n-lactate, allyl dilaurate, diallyltrimethoxysilyl, diallyltriethoxysilyl, diallyltripropoxysilyl, diallyltributoxysilyl, diallyltrihexyloxysilyl, diallyltriphenoxysilyl, etc.

Polyolefin monomers:

butadiene, isoprene, chloroprene, etc.

Vinyl monomers:

vinyl chloride, vinyl diacetate, allyl diacetate, divinyl propionate, vinyl pivalate, acrolein, methacrolein, etc.

Nitrile monomers:

acrylonitrile, dimethacrylonitrile, etc.

Among them, more preferable unsaturated monomers are methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, tert-butyl acrylate, tert-butyl methacrylate, 2-ethylhexyl acrylate, 2-ethylhexyl methacrylate, dodecyl acrylate, dodecyl methacrylate, cyclohexyl acrylate, cyclohexyl methacrylate, benzyl acrylate, benzyl methacrylate, and styrene.

The unsaturated monomer (b) including those of the formula (I) is preferably used in an amount of 1 to 99% by mole based on the total amounts of the monomers. When the amount is less than 1% by mole, there is a tendency to lower water resistance of the resin, whereas when the amount is more than 99% by mole, there is a tendency to lower the coating consuming properties.

The amount of the unsaturated monomers (b) other than those of the formula (I) is preferably 30 to 90% by mole based on the total amounts of the monomers considering the balance of water resistance and coating consuming properties.

The polymer (A) can be prepared by a process wherein a solution containing (a) an unsaturated carboxylic acid, (b) other copolymerizable monomer, and a radical polymerization catalyst is dropped in a solvent. The reaction temperature is preferably 0° to 180° C., more preferably about 40° to 170° C. The dropping time is preferably 1 to 10 hours, more preferably 2 to 6 hours. As the solvent, there can be used conventional organic solvents which have no reactivity with the unsaturated carboxylic acid.

As the organic solvent for polymerization, there can be used those which do not dissolve the copolymer produced by copolymerization. Examples of the organic solvent are alcohols such as methanol, ethanol, propanol, isopropanol, butanol, isobutanol, benzyl alcohol, etc.; polyalkylene glycols such as methyl Cellosolve, ethyl Cellosolve, ethylene glycol dimethyl ether, ethylene glycol monoacetate, etc.; aromatic hydrocarbons such as toluene, xylenes, etc.; esters such as ethyl acetate, butyl acetate, etc.; ketones such as cyclohexanone, methyl isobutyl ketone, etc.; halogen-containing solvents such as carbon tetrachloride, trichloroethane, etc. These organic solvents can be used singly or as a mixture thereof. It is also possible to use water as a solvent which is free from a problem of environmental pollution.

The carboxyl group-containing resin is difficult to use as a paint in an aromatic hydrocarbon solvent such as toluene, xylene, etc., which is low in polarity due to too high viscosity. Thus, in order to obtain a usable low viscosity using such a solvent, it is necessary to use a large amount of the solvent for dilution, resulting in obtaining a vanish having a very low solid resin content. In order to solve such a problem, it is preferable to use as a solvent an alcohol, polyalkylene glycol, or water having a function of a surfactant, alone or as a mixture with other solvent(s).

As the radical polymerization catalyst, there can be used azo compounds, peroxide compounds which are usually used as radical polymerization initiators. Examples of the radical polymerization catalyst (or initiator) are 2,2'-azobis(4-methoxy-2,4-dimethylvaleronitrile), 2,2'-azobis(cyclopropylpropionitrile), 2,2'-azobis(2,4-dimethylvaleronitrile), 2,2'-azobis(isobutyronitrile), 2,2'-azobis(2-methylbutyronitrile), 1,1'-azobis(cyclohexane-1-carbonitrile), 2-phenylazo-4-methoxy-2,4-dimethylvaleronitrile, benzoyl peroxide, di-tert-butyl peroxybenzoate, etc.

The amount of the initiator is not particularly limited, and is preferably 0.1 to 5% by weight, more preferably 0.2 to 4% by weight, based on the total weight of the monomers.

The number average molecular weight of the resulting polymer (A) is not particularly limited, and is preferably 500 to 200,000, more preferably 1,000 to 50,000, from the viewpoint of various properties of coating resins. The number average molecular weight is obtained by measuring with gel permeation chromatography, followed by calculation using standard polystyrene calibration curve.

In order to adjust the molecular weight, it is possible to add a chain transfer agent during the polymerization. Examples of the chain transfer agent are methanethiol, ethanethiol, n-propanethiol, isopropanethiol, n-butanethiol, 2-methylpropanethiol, 3-methylpropanethiol, 1,1-dimethylethanethiol, 1-hexanethiol, 1-octanethiol, 1-decanethiol, benzenethiol, 2-methylbenzenethiol, 3-methylbenzenethiol, 4-methylbenzenethiol, 2-ethylbenzenethiol, 3-ethylbenzenethiol, 4-ethylbenzenethiol, bis(4-hydroxydimethylphenyl)disulfide, bis(2-chloromethylphenyl)disulfide, bis(2-bromomethylphenyl)disulfide, dinaphthyldisulfide, di-2-benzothiadisulfide, α-methylstyrene dimer, carbon tetrachloride, carbon tetrabromide, chloroform, etc.

The amount of the chain transfer agent can properly be selected depending on the desired polymer.

The using amount of solvent is not particularly limited, and usually in a mass ratio of about ½ to 4 times based on the total amounts of monomers.

The polymerization is usually carried out in an inert gas atmosphere. As the inert gas, there can be used nitrogen, argon, helium, neon, etc.

As the additive (B), there can be used at least one member selected from group consisting of triazole derivatives, thiadiazole derivatives and bezothiazole derivatives.

The triazole derivatives include benzotriazole derivatives, amino substituted triazole derivatives and other triazole derivatives. Examples of these triazole derivatives are as follows.
Benzotriazole derivatives:
1,2,3-benzotriazole,
1,methyl-1,2-3-benzotriazole,
1-phenyl-1,2,3-benzotriazole,
4-chloro-1,2,3-benzotriazole,
4-nitro-1,2,3-benzotriazole,
5-methyl-1,2,3-benzotriazole,
5-ethyl-1,2,3-benzotriazole,
5-propyl-1,2,3-benzotriazole,
5-isobutyl-1,2,3-benzotriazole,
5-methoxy-1,2,3-benzotriazole,
5-chloro-1,2,3-benzotriazole,
5,6-dimethyl-1,2,3-benzotriazole,
1,2,3-benzotriazole carboxylic acid, and ester derivatives thereof,
N-dialkylaminomethyl-1,2,3-benzotriazoles
Amino substituted triazole derivatives:
4-amino-1,2,4-triazole,
3-amino-1H-1,2,4-triazole, etc.
Other triazole derivatives:
  alkyl, aryl, aralkyl, halogen or hydroxyl substituted triazole derivatives.
1,2,3-triazole,
1-methyl-1,2,3-triazole, 1-phenyl-1,2,3-triazole,
1-benzyl-1,2,3-triazole,
2-methyl-1,2,3-triazole,
2-phenyl-1,2,3-triazole,
2-benzyl-1,2,3-triazole,
4-methyl-1,2,3-triazole,
4-phenyl-1,2,3-triazole,
4-hydroxy-1,2,3-triazole,
4,5-dimethyl-1,2,3-triazole,
4-methyl-2-phenyl-1,2,3-triazole,
4,5-dimethyl-2-phenyl-1,2,3-triazole,
1,5-diphenyl-1,2,3-triazole,
1,2,4-triazole,
1-methyl-1,2,4-triazole,
1-phenyl-1,2,4-triazole,
3-methyl-1,2,4-triazole,
3-phenyl-1,2,4-triazole,
3-chloro-1,2,4-triazole,
3-bromo-1,2,4-triazole,
3,5-dimethyl-1,2,4-triazole,
3,5-diethyl-1,2,4-triazole,
1,3-diphenyl-1,2,4-triazole,
1,5-diphenyl-1,2,4-triazole,
3,5-diphenyl-1,2,4-triazole, etc.

Benzothiazole derivatives preferably sulfur-substituted benzothiazole derivatives:
2-mercaptobenzothiazole,
dibenzothiazyl disulfide
N-oxydiethylenebenzothiazyl-2-sulfenamide,
N,N-diisopropylbenzothiazyl-2-sulfenamide,
N,N-dicyclohexylbenzothiazyl-2-sulfenamide,
3-(2-benzothiazylthio)propionic acid,
(2-benzothiazylthio)acetic acid, etc.

Thiadiazole derivatives preferably sulfur-substituted thiadiazole derivatives:
2-mercapto-1,3,4-thiadiazole,
2,5-dimercapto-1,3,4-thiadiazole,
2-amino-5-mercapto-1,3,4-thiadiazole,
2-methyl-5-mercapto-1,3,4-thiadiazole,
2-methylamino-5-mercapto-1,3,4-thiadiazole,
2-thioacetic acid-5-mercapto-1,3,4-thiadiazole, etc.

Among these additives (B), the triazole derivatives are preferable due to high effects. For example, 1,2,3-benzotriazole, 1,2,4-triazole, 3-amino-1H-1,2,4-triazole are more preferable, and 1,2,4-triazole or 3-amino-1H-1,2,4-triazole are particularly preferable.

The additive (B) is used preferably in an amount of 0.1 to 50% by weight, more preferably 0.2 to 10% by weight, based on the weight of the polymer (A) (solid resin content). When the amount is less than 0.1% by weight, effects of addition becomes insufficient and a viscosity increase easily takes place when a coating composition is prepared using a copper compound. On the other hand, when the amount is more than 50% by weight, it is difficult to form a good coating.

The coating varnish composition may further contain one or more polymers other than the polymer (A) so long as the effects of the present invention are not damaged.

The antifouling coating composition of the present invention comprises (i) the coating varnish composition mentioned above, and (ii) an antifouling agent containing a copper compound as a major component.

The antifouling coating composition may further contain one or more colorants such as pigments, various additives, e.g. extenders, dispersing agents and anti-sagging agents.

As the antifouling agent, it is preferable to use a copper compound which is an inorganic antifouling agent as a major component. Examples of the copper compound are cupric chromate, cupric ferrocyanate, cupric quinoline, cupric δ-hydroquinone, cupric oleate, cupric nitrate, cupric phosphate, cupric tartarate, cuprous oxide, copper rhodanide, copper-nickel solid solution alloys, cuprous iodide, cuprous sulfite, etc.

The amount of the copper compound is not particularly limited, but it is preferable to use in an amount of 50 to 100% by weight, more preferably 70 to 100% by weight, based on the weight of the total antifouling agents.

It is possible to use conventional inorganic antifouling agents and organic antifouling agents as a minor component. Examples of the conventional inorganic antifouling agents are zinc oxide, zinc chromate, strontium chromate, etc.

Examples of the organic antifouling agent are 2,4,5,6-tetrachloroisophthalonitrile, N,N-dimethyldichlorophenylurea, 4,5-dichloro-2-n-octyl-3(2H)-isothiazolone, zinc dimethyldithiocarbamate, 2-methylthio-4-tert-butylamino-6-cyclopropylamino-s-triazine, N-(fluorodichloromethylthio)phthalimide, N,N′-dimethyl-N′-phenyl-(N-fluorodichloromethylthio)sulfamide, 2-pyridinethiol-1-oxide zinc salt, tetramethylthiuramdisulfide, 2,4,6-trichlorophenylmaleimide, 2,3,5,6-tetrachloro-4-(methylsulfonyl)pyridine, 3-iodo-2-propenylbutylcarbamate, diiodomethyl-para-trisulfone, bisdimethyldithiocarbamoyl zinc ethylenebisdithiocarbamate, pyridine-triphenylborane, etc.

As the antifouling agent, it is possible to use together one or more organotin compounds, triazine compounds, and organic sulfur compounds as a minor component.

The amount of the antifouling agent is not particularly limited, but it is preferable to use in an amount of 1 to 500% by weight, more preferably 50 to 450% by weight, based on the weight of the total polymers (solid resin content). When the amount is less than 1% by weight, it is difficult to expect the effect of the antifouling agent. On the other hand, when the amount is more than 500% by weight, it is difficult to form a good coating.

As the pigment, there can be used inorganic pigments such as titanium oxide (titanium white), iron oxide, carbon black, etc.; and organic pigments such as azos, cyanines, phthalocyanines, quinacridones, etc. Usually, inorganic pigments are used. These pigments are used depending on the necessity. The using amount is not particularly limited and usually is 200% by weight or less based on the weight of the total polymers (solid resin content). When the amount is more than 200% by weight, there is a tendency to lower stability of the resulting coating.

As the extender, there can be used calcium carbonate, barium sulfate, magnesium oxide, alumina, zeolite, etc. The extender is used depending on the necessity. The using amount is not particularly limited and usually is 100% by weight or less based on the weight of the total polymers (solid resin content). When the amount is more than 100% by weight, there is a tendency to lower stability of the resulting coating.

As the dispersing agent or anti-sagging agent, there can be used one or more inorganic dispersing or anti-sagging agents and organic dispersing or antisagging agents. Examples of the inorganic dispersing or anti-sagging agent are silica gel, bentonite, kaolinite, talc, pectolite, montomorillonite, saponite, beidellite, etc.

Examples of the organic dispersing or anti-sagging agent are fatty acid amides, fatty acid esters, oxidized polyethylenes, sulfuric acid ester-based anionic surfactants, polycarboxylic acid amine salts, polycarboxylic acids, polyamides, high polymer polyethers, acrylic copolymers, special silicones, etc.

The using amount is not particularly limited and usually used in an amount of 0.01 to 100% by weight based on the weight of the total polymers (solid resin content). When the amount is less than 0.01% by weight, it is difficult to exhibit the effect sufficiently. On the other hand, when the amount is more than 100% by weight, there is a tendency to lower stability of the resulting coating.

Further, it is possible to use a release assistant such as rosin, gum rosin, wood rosin, tall oil rosin together.

The antifouling coating composition is useful as ship bottom paints, fish-net paints, etc.

The present invention is illustrated by way of the following Examples, in which all percents are by weight unless otherwise specified. Further, in the following Examples, the coating varnish (composition) is simplified as "a varnish (composition)" and the antifouling coating composition is simplified as "a coating composition".

Production Example 1

In a four-necked flask equipped with a stirrer, a condenser, a nitrogen gas introducing pipe, a dropping funnel and a thermometer, 125.0 g of xylene was placed and maintained at 95° C. with stirring. Then, a mixture of 234.2 g of n-butyl methacrylate, 15.8 g of methacrylic acid and 2.5 g of 2,2'-azobis(isobutyronitrile) (hereinafter referred to as "AIBN") was added dropwise for 3 hours with stirring under a nitrogen gas stream. After the dropwise addition, the flask was maintained at 95° C. for 1 hour with stirring. Then, a mixture of 50.0 g of xylene and 0.5 g of AIBN was added to the flask dropwise for 1 hour, followed by heating at 95° C. for 2 hours. After adding 575.0 g of xylene, the flask was cooled naturally to prepare a varnish. The number average molecular weight of the resulting polymer was 22,000.

Production Example 2

In a four-necked flask equipped with a stirrer, a condenser, a nitrogen gas introducing pipe, a dropping funnel and a thermometer, 125.0 g of xylene was placed and maintained at 95° C. with stirring. Then, a mixture of 234.2 g of n-butyl methacrylate, 15.8 g of methacrylic acid, and 2.5 g of AIBN was added dropwise for 3 hours with stirring under a nitrogen gas stream. After the dropwise addition, the flask was maintained at 95° C. for 1 hour with stirring. Then, a mixture of 50.0 g of xylene and 0.5 g of AIBN was added to the flask dropwise for 1 hour, followed by heating at 95° C. for 2 hours. Then, 200.0 g of xylene and 41.6 g of n-butanol were added to the flask, followed by natural cooling to prepare a varnish. The number average molecular weight of the resulting polymer was 21,400.

Production Example 3

In a four-necked flask equipped with a stirrer, a condenser, a nitrogen gas introducing pipe and a thermometer, 150.0 g of xylene was placed and maintained at 95° C. with stirring. Then, a mixture of 286.3 g of 2-ethylhexyl methacrylate, 13.1 g of methacrylic acid and 3.00 g of AIBN was added dropwise for 3 hours with stirring under a nitrogen gas stream. After the dropwise addition, the flask was maintained at 95° C. for 1 hour with stirring. Then, a mixture of 100.0 g of xylene and 0.6 g of AIBN was added dropwise to the flask for 1 hour, followed by heating at 95° C. for 2 hours. Then, 200.0 g of xylene was added to the flask, followed by natural cooling to prepare a varnish. The number average molecular weight of the resulting polymer was 18,300.

Production Example 4

In a four-necked flask equipped with a stirrer, a condenser, a nitrogen gas introducing pipe and a thermometer, 72.0 g of n-butanol was placed and refluxed with stirring. Then, a mixture of 64.5 g of n-butyl acrylate, 45.1 g of methacrylic acid, 10.4 g of unsaturated monomer of the formula (I) (Illustrated Compound No. (9), R=CH$_3$) and 1.8 g of AIBN was added dropwise for 2 hours with stirring under a nitrogen gas stream. After dropwise addition, the flask was further refluxed with stirring for 1 hour. Then, a mixture of 18.0 g of n-butanol and 0.24 g of AIBN were added dropwise for 1 hour, followed by heating under reflux for 2 hours. After adding 90.0 g of xylene, the flask was cooled naturally to prepare a varnish. The number average molecular weight of the resulting polymer was 7,800.

Production Example 5

In a four-necked flask equipped with a stirrer, a condenser, a nitrogen gas introducing pipe, a dropping funnel, and a thermometer, 72.0 g of n-butanol was placed and refluxed with stirring. Then, a mixture of 62.8 g of n-butyl acrylate, 46.9 g of methacrylic acid, 10.3 g of unsaturated monomer of the formula (I) (Illustrated Compound No. (2), R=CH$_3$) and 1.8 g of AIBN was added dropwise for 2 hours with stirring under a nitrogen gas stream. After dropwise addition, the flask was further refluxed with stirring for 1 hour. Then, a mixture of 18.0 g of n-butanol and 0.24 g of AIBN was added dropwise for 1 hour, followed by heating under reflux for 2 hours. After adding 80.0 g of xylene, the flask was cooled naturally to prepare a varnish. The number average molecular weight of the resulting polymer was 7,200.

Production Example 6

In a four-necked flask equipped with a stirrer, a condenser, a nitrogen gas introducing pipe, a dropping funnel and a thermometer, 72.0 g of n-butanol was placed and refluxed with stirring. Then, a mixture of 42.7 g of n-butyl acrylate, 35.9 g of methacrylic acid, 41.4 g of unsaturated monomer of the formula (I) (Illustrated Compound No. (9), R=CH$_3$) and 1.8 g of AIBN was added dropwise for 2 hours with stirring under a nitrogen gas stream. After dropwise addition, the flask was further refluxed with stirring for 1 hour. Then, a mixture of 18.0 g of n-butanol and 0.24 g of AIBN was added dropwise for 1 hour, followed by heating under reflux for 2 hours. After adding 90.0 g of xylene, the flask was cooled naturally to prepare a varnish. The number average molecular weight of the resulting polymer was 7,000.

Production Example 7

In a four-necked flask equipped with a stirrer, a condenser, a nitrogen gas introducing pipe, a dropping funnel and a thermometer, 72.0 g of n-butanol was placed and refluxed with stirring. Then, a mixture of 65.6 g of n-butyl acrylate, 35.2 g of methacrylic acid, 19.3 g of unsaturated monomer of the formula (I) (Illustrated Compound No. (2), R=CH₃), and 1.8 g of AIBN was added dropwise for 2 hours with stirring under a nitrogen gas stream. After dropwise addition, the flask was further refluxed with stirring for 1 hour. Then, a mixture of 18.0 g of n-butanol and 0.24 g of AIBN was added dropwise for 1 hour, followed by maintaining of the temperature for 2 hours. After adding 90.0 g of xylene, the flask was cooled naturally to prepare a varnish. The number average molecular weight of the resulting polymer was 6,200.

Production Example 8

In a four-necked flask equipped with a stirrer, a condenser, a nitrogen gas introducing pipe, a dropping funnel and a thermometer, 72.0 g of n-butanol was placed and refluxed with stirring. Then, a mixture of 71.8 g of n-butyl acrylate, 48.2 g of methacrylic acid, and 1.8 g of AIBN was added dropwise for 2 hours with stirring under a nitrogen gas stream. After dropwise addition, the flask was further refluxed with stirring for 1 hour. Then, a mixture of 18.0 g of n-butanol and 0.24 g of AIBN was added dropwise for 1 hour, followed by heating under reflux for 2 hours. After adding 90.0 g of xylene, the flask was cooled naturally to prepare a varnish. The number average molecular weight of the resulting polymer was 6,500.

Production Example 9

A varnish was prepared by mixing with well stirring 160 g of the varnish obtained in Production Example 1 and 25 g of the varnish obtained in Production Example 6.

Production Example 10

A varnish was prepared by mixing with well stirring 100 g of the varnish obtained in Production Example 3 and 25 g of the varnish obtained in production Example 6.

Production Example 11

A varnish was prepared by mixing with well stirring 75 g of the varnish obtained in Production Example 3 and 50 g of the varnish obtained in Production Example 6.

Production Example 12

A varnish was prepared by mixing with well stirring 100 g of the varnish obtained in Production Example 3 and 25 g of the varnish obtained in Production Example 7.

Production Example 13

A varnish was prepared by mixing with well stirring 75 g of the varnish obtained in production Example 3 and 50 g of the varnish obtained in Production Example 7.

Production Example 14

A varnish was prepared by mixing with well stirring 120 g of the varnish obtained in Production Example 1 and 50 g of the varnish obtained in Production Example 7.

Production Example 15

A varnish was prepared by mixing with well stirring 80 g of the varnish obtained in Production Example 2 and 50 g of the varnish obtained in Production Example 7.

Production Example 16

A varnish was prepared by mixing with well stirring 80 g of the varnish obtained in Production Example 8 and 50 g of the varnish obtained in Production Example 6.

Examples 1 to 27

A varnish composition was prepared by adding an additive (B) in an amount shown in Tables 1 to 3 to each varnish prepared above and having a solid resin content of 25 g, followed by kneading with stirring using a homogenizer. To the resulting varnish composition, 75 g of cuprous oxide (purity 90% or more, powder) was added and kneaded with stirring to give a coating composition.

TABLE 1

| | Examples | | | | | | | | |
|---|---|---|---|---|---|---|---|---|---|
| | 1 | 2 | 3 | 4 | 5 | 6 | 7 | 8 | 9 |
| Polymer | | | | | | | | | |
| Production Example 1 | 25 | — | — | — | — | 25 | — | — | 25 |
| Production Example 2 | — | 25 | — | — | — | — | 25 | — | — |
| Production Example 3 | — | — | 25 | — | — | — | — | 25 | — |
| Production Example 4 | — | — | — | 25 | — | — | — | — | — |
| Production Example 5 | — | — | — | — | 25 | — | — | — | — |
| Cuprous oxide | 75 | 75 | 75 | 75 | 75 | 75 | 75 | 75 | 75 |
| 3-Amino-1H-1,2,4-triazole | 0.25 | 0.25 | 0.25 | 0.25 | 0.25 | — | — | — | — |
| 1,2,4-Triazole | — | — | — | — | — | 0.75 | 0.75 | 0.75 | — |
| 1,2,3-Benzotriazole | — | — | — | — | — | — | — | — | 0.75 |

TABLE 2

| | Examples | | | | | | | | |
|---|---|---|---|---|---|---|---|---|---|
| | 10 | 11 | 12 | 13 | 14 | 15 | 16 | 17 | 18 |
| Polymer | | | | | | | | | |
| Production Example 1 | — | 25 | — | 25 | — | — | 25 | — | — |
| Production Example 2 | — | — | 25 | — | 25 | — | — | 25 | — |
| Production Example 3 | 25 | — | — | — | — | 25 | — | — | 25 |
| Cuprous oxide | 75 | 75 | 75 | 75 | 75 | 75 | 75 | 75 | 75 |
| 1,2,3-Benzotriazole | 0.75 | 0.25 | 0.25 | — | — | — | — | — | — |
| (2-Benzothiazylthio)acetic acid | — | — | — | 0.75 | 0.75 | 0.75 | — | — | — |
| 2,5-Dimercapto-1,3,4- | — | — | — | — | — | — | 0.75 | 0.75 | 0.75 |

TABLE 2-continued

| | Examples | | | | | | | | |
|---|---|---|---|---|---|---|---|---|---|
| | 10 | 11 | 12 | 13 | 14 | 15 | 16 | 17 | 18 |
| thiadiazole | | | | | | | | | |

TABLE 3

| | Examples | | | | | | | | |
|---|---|---|---|---|---|---|---|---|---|
| | 19 | 20 | 21 | 22 | 23 | 24 | 25 | 26 | 27 |
| Polymer | | | | | | | | | |
| Production Example 8 | 25 | — | — | — | — | — | — | — | — |
| Production Example 9 | — | 25 | — | — | — | — | — | — | — |
| Production Example 10 | — | — | 25 | — | — | — | — | — | — |
| Production Example 11 | — | — | — | 25 | — | — | — | — | — |
| Production Example 12 | — | — | — | — | 25 | — | — | — | — |
| Production Example 13 | — | — | — | — | — | 25 | — | — | — |
| Production Example 14 | — | — | — | — | — | — | 25 | — | — |
| Production Example 15 | — | — | — | — | — | — | — | 25 | — |
| Production Example 16 | — | — | — | — | — | — | — | — | 25 |
| Cuprous oxide | 75 | 75 | 75 | 75 | 75 | 75 | 75 | 75 | 75 |
| 3-Amino-1H-1,2,4-triazole | 0.25 | — | — | 0.25 | — | — | 0.25 | — | 0.25 |
| 1,2,4-Triazole | — | — | 0.75 | — | 0.75 | — | — | 0.75 | — |
| 1,2,3-Benzotriazole | — | 0.25 | — | — | — | 0.25 | — | — | — |

Comparative Production Example 1

According to the process disclosed in JP-A 57-92061, an organic high polymer compound was obtained by charging 240 g of tri-n-butyltin methacrylate, 140 g of methyl methacrylate, 15 g of octyl acrylate, 5 g of butyl acrylate and 400 g of xylene into a 1-liter flask equipped with a thermometer and a stirrer, adding thereto 2 g of benzoyl peroxide as a polymerization catalyst, carrying out polymerization at 100 to 105° C. for 4 hours and at 120° to 125° C. for 1 hour.

Comparative Production Example 2

According to the process disclosed in WO 84/02915, a high polymer having a molecular weight of 11,000 was obtained by charging 114.6 g 2,2,2-trifluoroethyl methacrylate, 14.6 g of methyl methacrylate, 20.3 g of butyl acrylate and 150 g of xylene into a 500-ml flask equipped with a thermometer and a stirrer, adding thereto 1.5 g of AIBN as a polymerization catalyst, heating at 80° C. for 1 hour and polymerizing at 80° C. for 6 hours.

Comparative Production Example 3

According to the process disclosed in WO 84/02915, a high polymer having a molecular weight of 12,300 was obtained by charging 118.2 g p-nitrophenyl acrylate, 13.1 g of methyl methacrylate, 18.6 of butyl acrylate, and 150 g of xylene, adding thereto 1.5 g of AIBN as a polymerization catalyst, heating at 80° C. for 1 hour and polymerizing at 80° C. for 6 hours.

Comparative Production Example 4

According to the process disclosed in JP-A 58-180565, the following procedures were carried out.

(A) Polymer A

Polymer A was prepared by charging 80 g of xylene into a 300-ml flask equipped with a thermometer and a stirrer, raising the temperature to 100° C. while blowing nitrogen thereinto, adding dropwise a mixture of 100 g of methoxy diethylene glycol methacrylate, and 1.3 g of tert-butyl peroxy(2-ethylhexate) for 2 hours with stirring, stirring at the same temperature as that of the finish of dropwise addition for 2 hours, adding thereto a mixture of 0.2 g of tert-butyl peroxy(2-ethylhexate) and 10 g of xylene, stirring for further 1 hour, raising the temperature to 120° C., completing the polymerization reaction at 120° C. for 1 hour, and adding thereto 10 g of xylene, followed by cooling.

(B) Polymer B

Polymer B was prepared by charging 80 g of xylene into a 300-ml flask equipped with a thermometer and a stirrer, raising the temperature to 100° C. while blowing nitrogen thereinto, adding dropwise a mixture of 100 g of methyl methacrylate, and 1.3 g of tert-butyl peroxy(2-ethylhexate) for 2 hours with stirring, stirring at the same temperature as that of the finish of dropwise addition for 2 hours, adding thereto a mixture of 0.2 g of tert-butyl peroxy(2-ethylhexate) and 10 g of xylene, stirring for further 1 hour, rasing the temperature to 120° C., completing the polymerization reaction at 120° C. for 1 hour, and adding thereto 10 g of xylene, followed by cooling.

(C) Polymer C

Polymer C was prepared by mixing with dissolution 20 g of the Polymer A synthesized above and 80 g of the Polymer B synthesized above at 100° C.

Comparative Examples 1 to 14

To each varnish obtained in the abovementioned Comparative Production Examples and having 25 g of solid resin content, 75 g of cuprous oxide (purity 90% or more, powder) was added and kneaded with stirring to prepare a coating composition using a homogenizer. Tables 4 and 5 show the formulation of Comparative Examples 1 to 19.

Comparative Example 15

To the varnish obtained in Comparative Production Example 1 and having 25 g of solid resin content, 250 mg of 1,2,4-triazole was added and kneaded with stirring using a homogenizer to prepare a varnish composition. To the resulting varnish composition, 75 g of cuprous oxide (purity 90% or more, powder) was added and kneaded with stirring to prepare a coating composition using a homogenizer.

Comparative Example 16

To the varnish obtained in Comparative Production Example 1 and having 25 g of solid resin content, 250 mg of 1,2,3-benzotriazole was added and kneaded with stirring using a homogenizer to prepare a varnish composition. To the resulting varnish composition, 75 g of cuprous oxide (purity 90% or more, powder) was added and kneaded with stirring to prepare a coating composition using a homogenizer.

Comparative Examples 17 to 19

To each varnish obtained in Comparative Production Examples 2 to 4 and having 25 g of solid resin content, 75 g of cuprous oxide (purity 90% or more, powder) was added and kneaded with stirring to prepare a varnish composition using a homogenizer.

Compositions of Comparative Examples 1 to 19 are shown in Tables 4 and 5.

TABLE 4

| | Comparative Examples | | | | | | | | | |
|---|---|---|---|---|---|---|---|---|---|---|
| | 1 | 2 | 3 | 4 | 5 | 6 | 7 | 8 | 9 | 10 |
| Polymer | | | | | | | | | | |
| Production Example 1 | 25 | — | — | — | — | — | — | — | — | — |
| Production Example 2 | — | 25 | — | — | — | — | — | — | — | — |
| Production Example 3 | — | — | 25 | — | — | — | — | — | — | — |
| Production Example 4 | — | — | — | 25 | — | — | — | — | — | — |
| Production Example 5 | — | — | — | — | 25 | — | — | — | — | — |
| Production Example 8 | — | — | — | — | — | 25 | — | — | — | — |
| Production Example 9 | — | — | — | — | — | — | 25 | — | — | — |
| Production Example 10 | — | — | — | — | — | — | — | 25 | — | — |
| Production Example 11 | — | — | — | — | — | — | — | — | 25 | — |
| Production Example 12 | — | — | — | — | — | — | — | — | — | 25 |
| Cuprous oxide | 75 | 75 | 75 | 75 | 75 | 75 | 75 | 75 | 75 | 75 |

TABLE 5

| | Comparative Examples | | | | | | | | |
|---|---|---|---|---|---|---|---|---|---|
| | 11 | 12 | 13 | 14 | 15 | 16 | 17 | 18 | 19 |
| Polymer | | | | | | | | | |
| Production Example 13 | 25 | — | — | — | — | — | — | — | — |
| Production Example 14 | — | 25 | — | — | — | — | — | — | — |
| Production Example 15 | — | — | 25 | — | — | — | — | — | — |
| Production Example 16 | — | — | — | 25 | — | — | — | — | — |
| Comparative Production Example 1 | — | — | — | — | 25 | 25 | — | — | — |
| Comparative Production Example 2 | — | — | — | — | — | — | 25 | — | — |
| Comparative Production Example 3 | — | — | — | — | — | — | — | 25 | — |
| Comparative Production Example 4 | — | — | — | — | — | — | — | — | 25 |
| Cuprous oxide | 75 | 75 | 75 | 75 | 75 | 75 | 75 | 75 | 75 |
| 1,2,4-Triazole | — | — | — | — | 0.25 | — | — | — | — |
| 1,2,3-Benzotriazole | — | — | — | — | — | 0.25 | — | — | — |

Storage Stability Test

Coating compositions prepared in Examples 1 to 27 and Comparative Examples 1 to 16 were stored at room temperature overnight, followed by observation of state of paint and measurement of viscosity at 25° C.

The antifouling coating compositions were sealed in sample bottles and stored in a constant temperature bath at 40° C. for 20 days.

After storage, the state of paint was observed and the viscosity at 25° C. was measured. The results are shown in Tables 6 to 10.

The state of paint was evaluated after storage as follows:

○: The state of paint was very smooth and good.
x: The state of paint was like custard pudding or impurities were retained in the paint to make the surface unsmooth.

TABLE 6

| Coating Composition | Viscosity change (Pa · s) | | State of paint |
|---|---|---|---|
| | 0 day | 20 days | |
| Example 1 | 4.0 | 4.2 | ○ |
| Example 2 | 0.7 | 0.9 | ○ |
| Example 3 | 2.4 | 2.6 | ○ |
| Example 4 | 2.6 | 2.7 | ○ |
| Example 5 | 2.0 | 2.1 | ○ |
| Example 6 | 2.6 | 3.1 | ○ |
| Example 7 | 0.8 | 1.2 | ○ |
| Example 8 | 2.9 | 3.8 | ○ |
| Example 9 | 1.4 | 1.6 | ○ |
| Example 10 | 1.5 | 1.8 | ○ |

TABLE 7

| Coating Composition | Viscosity change (Pa · s) | | State of paint |
|---|---|---|---|
| | 0 day | 20 days | |
| Example 11 | 1.4 | 4.6 | ○ |
| Example 12 | 0.5 | 2.4 | ○ |
| Example 13 | 5.1 | 7.8 | ○ |
| Example 14 | 1.0 | 1.8 | ○ |
| Example 15 | 3.8 | 5.4 | ○ |
| Example 16 | 3.8 | 3.9 | ○ |
| Example 17 | 0.6 | 0.7 | ○ |
| Example 18 | 2.2 | 2.3 | ○ |
| Example 19 | 5.7 | 5.8 | ○ |
| Example 20 | 4.3 | 4.6 | ○ |

TABLE 8

| Coating Composition | Viscosity change (Pa · s) | | State of paint |
|---|---|---|---|
| | 0 day | 20 days | |
| Example 21 | 1.0 | 1.6 | ○ |
| Example 22 | 1.4 | 1.5 | ○ |
| Example 23 | 0.9 | 1.4 | ○ |
| Example 24 | 1.1 | 1.4 | ○ |
| Example 25 | 3.0 | 3.1 | ○ |
| Example 26 | 1.9 | 2.4 | ○ |
| Example 27 | 2.0 | 2.0 | ○ |

TABLE 9

| Coating Composition | Viscosity change (Pa · s) | | State of paint |
|---|---|---|---|
| | 0 day | 20 days | |
| Comparative Example 1 | 2.6 | Pudding-like | x |
| Comparative Example 2 | 0.5 | " | x |
| Comparative Example 3 | 1.7 | " | x |
| Comparative Example 4 | 2.2 | 89.7 | Increase of viscosity |
| Comparative Example 5 | 1.4 | 30.2 | Increase of viscosity |
| Comparative Example 6 | 5.5 | Pudding-like | x |
| Comparative Example 7 | 4.2 | " | x |
| Comparative Example 8 | 0.8 | " | x |
| Comparative Example 9 | 1.1 | " | x |
| Comparative | 0.7 | " | x |

TABLE 9-continued

| Coating Composition | Viscosity change (Pa · s) 0 day | 20 days | State of paint |
|---|---|---|---|
| Example 10 | | | |

TABLE 10

| Coating Composition | Viscosity change (Pa · s) 0 day | 20 days | State of paint |
|---|---|---|---|
| Comparative Example 11 | 0.9 | Pudding-like | x |
| Comparative Example 12 | 2.7 | " | x |
| Comparative Example 13 | 1.5 | " | x |
| Comparative Example 14 | 3.0 | " | x |
| Comparative Example 15 | 2.6 | 20.3 | x |
| Comparative Example 16 | 2.4 | 11.6 | x |

Coating Test

Using the antifouling coating compositions mentioned above before storage at 40° C. for 20 days for the storage stability test, coatings were formed on FRP plates and dried at room temperature for 2 days naturally.

Surface states of the resulting paint films were observed by the naked eye. The results are shown in Tables 11 to 14.

Evaluation was carried out as follows:
○: Coating has a very smooth surface.
x : Coating has a surface with poor smoothness due to a number of graininess.

TABLE 11

| Coating comosition | State of coating |
|---|---|
| Example 1 | ○ |
| Example 2 | ○ |
| Example 3 | ○ |
| Example 4 | ○ |
| Example 5 | ○ |
| Example 6 | ○ |
| Example 7 | ○ |
| Example 8 | ○ |
| Example 9 | ○ |
| Example 10 | ○ |

TABLE 12

| Coating comosition | State of coating |
|---|---|
| Example 11 | ○ |
| Example 12 | ○ |
| Example 13 | ○ |
| Example 14 | ○ |
| Example 15 | ○ |
| Example 16 | ○ |
| Example 17 | ○ |
| Example 18 | ○ |
| Example 19 | ○ |
| Example 20 | ○ |

TABLE 13

| Coating comosition | State of coating |
|---|---|
| Example 21 | ○ |
| Example 22 | ○ |
| Example 23 | ○ |
| Example 24 | ○ |

TABLE 13-continued

| Coating comosition | State of coating |
|---|---|
| Example 25 | ○ |
| Example 26 | ○ |
| Example 27 | ○ |

TABLE 14

| Coating comosition | State of coating |
|---|---|
| Comparative Example 15 | x |
| Comparative Example 16 | x |

As is clear from Tables 11 to 13, when the coating compositions of the present invention (Examples 1 to 27) are used, there can be obtained coatings having a very smooth surface.

On the other hand, as is clear from Table 14, when the coating compositions of Comparative Examples 15 and 16 are used, a number of graininess takes place on the surfaces of paint films to make the surface smoothness very poor.

Paint Film Consumption Test (1)

The coating formed by using the varnish composition of the present invention has a property of gradually becoming water-soluble under the condition of weak alkaline and releasing. This is shown by the following experiments.

Each coating composition prepared in Examples 1 to 27 was coated on a polypropylene plate of 150 mm long and 100 mm wide so as to make the film thickness 50 μm after dried and allowed to stand at room temperature for 2 days. After removing the solvent, an initial weight was measured. Then, the polypropylene plate was dipped in 1750 cm³ of an alkaline buffer solution of pH 10.2 at 45° C. for 24 hours. Then, the polypropylene plate was taken out, washed with water, dried and weighed the final weight. From this weight difference, the hydrolysis properties (or consuming properties) was evaluated by the weight loss of coating.

The results are shown in Tables 15 to 17.

TABLE 15

| Coating composition | Weight loss of coating (mg/100 cm²) |
|---|---|
| Example 1 | Released all |
| Example 2 | " |
| Example 3 | " |
| Example 4 | " |
| Example 5 | " |
| Example 6 | " |
| Example 7 | " |
| Example 8 | " |
| Example 9 | " |
| Example 10 | " |

TABLE 16

| Coating composition | Weight loss of coating (mg/100 cm²) |
|---|---|
| Example 11 | Released all |
| Example 12 | " |
| Example 13 | " |
| Example 14 | " |
| Example 15 | " |
| Example 16 | " |
| Example 17 | " |
| Example 18 | " |
| Example 19 | " |

TABLE 16-continued

| Coating composition | Weight loss of coating (mg/100 cm²) |
| --- | --- |
| Example 20 | " |

TABLE 17

| Coating composition | Weight loss of coating (mg/100 cm²) |
| --- | --- |
| Example 21 | Released all |
| Example 22 | " |
| Example 23 | " |
| Example 24 | " |
| Example 25 | " |
| Example 26 | " |
| Example 27 | " |

As is clear from the above experimental results, the coating compositions of the present invention have good self-disintegration properties. These results show that the coating composition of the present invention is very suitable for self-disintegration type antifouling coating composition.

Examples 28 to 54, Comparative Examples 20 to 24

Each coating composition was prepared by kneading with stirring each coating composition produced in Examples 1 to 27 and Comparative Examples 15 to 19 with 16.7 g of calcium carbonate, 8.3 g of red oxide (iron (III) oxide), 1.7 g of FLOWNON SP-1000 (Amide wax paste mfd. by Kyoeisha Kagaku K. K.), 8.3 g of 4,5-dichloro-2-n-octyl-4-isothiazolin-3-one and 6.7 g of xylene, followed by addition of glass beads (diameter 2 mm) using a mechanical stirrer, followed by filtration of the glass beads.

Coating Consumption Test (2)

Each coating composition of Examples 28 to 54 and Comparative Examples 22 and 23 were coated on an FRP plate so as to make the coating thickness after dried 100 μm, and dried at room temperature for 2 days naturally. The resulting FRP plate was fixed on a disc rotor plate and revolved in the seawater (temperature 15°±2° C.) at a constant rate (about 15 knot of peripheral speed) for 2 months. After measuring the consumed coating thickness of the coating and release rate of copper, the surface of coating was observed.

The results are shown in Tables 18 to 23.

TABLE 18

| Coating composition | Consumed coating thickness (μm/month) | State of consumed coating |
| --- | --- | --- |
| Example 28 | 9 | Uniform |
| Example 29 | 8 | " |
| Example 30 | 8 | " |
| Example 31 | 17 | " |
| Example 32 | 17 | " |
| Example 34 | 8 | " |
| Example 35 | 7 | " |
| Example 37 | 7 | " |
| Example 42 | 8 | " |
| Example 43 | 8 | " |

TABLE 19

| Coating composition | Consumed coating thickness (μm/month) | State of consumed coating |
| --- | --- | --- |
| Example 46 | 15 | Uniform |

TABLE 19-continued

| Coating composition | Consumed coating thickness (μm/month) | State of consumed coating |
| --- | --- | --- |
| Example 47 | 14 | " |
| Example 48 | 12 | " |
| Example 49 | 15 | " |
| Example 50 | 9 | " |
| Example 51 | 10 | " |
| Example 52 | 11 | " |
| Example 53 | 12 | " |
| Example 54 | 16 | " |

TABLE 20

| Coating composition | Consumed coating thickness (μm/month) | State of consumed coating |
| --- | --- | --- |
| Comparative Example 20 | 4–16 | Non-uniform |
| Comparative Example 21 | 4–16 | " |
| Comparative Example 22 | 1 | Uniform |
| Comparative Example 23 | 1 | " |

TABLE 21

| Coating composition | Release rate of copper (μg/cm²/day) | | |
| --- | --- | --- | --- |
| | Initial | 1 month | 2 months |
| Example 28 | 15 | 17 | 18 |
| Example 29 | 14 | 17 | 18 |
| Example 30 | 13 | 16 | 17 |
| Example 31 | 30 | 37 | 38 |
| Example 32 | 31 | 38 | 37 |
| Example 34 | 14 | 16 | 18 |
| Example 35 | 13 | 16 | 17 |
| Example 37 | 14 | 16 | 16 |
| Example 42 | 11 | 13 | 14 |
| Example 43 | 10 | 14 | 14 |

TABLE 22

| Coating composition | Release rate of copper (μg/cm²/day) | | |
| --- | --- | --- | --- |
| | Initial | 1 month | 2 months |
| Example 46 | 27 | 33 | 35 |
| Example 47 | 25 | 29 | 31 |
| Example 48 | 24 | 28 | 29 |
| Example 49 | 28 | 32 | 32 |
| Example 50 | 16 | 20 | 19 |
| Example 51 | 17 | 20 | 20 |
| Example 52 | 19 | 24 | 25 |
| Example 53 | 20 | 25 | 25 |
| Example 54 | 30 | 35 | 36 |

TABLE 23

| Coating composition | Release rate of copper (μg/cm²/day) | | |
| --- | --- | --- | --- |
| | Initial | 1 month | 2 months |
| Comparative Example 22 | 3 | 2 | 1 or less |
| Comparative Example 23 | 2 | 1 or less | 1 or less |

As is clear from Tables 18 to 23, the coating compositions of the present invention bring about remarkably uniform consumption of coatings and are very useful as antifouling paint. In contrast, when the coating compositions according to JP-A 57-92061 are used (Comparative Examples 20 and 21), non-uniform consumption of paint films takes place and unevenness of coating surfaces become remarkable compared with the initial time of the test, resulting in remarkably increasing friction resistance to the seawater. Further, as is clear from Tables 20 and 23, the coatings prepared by using the coating compositions of WO 84/02915 (Comparative Examples 22 and 23) are low in the consumed amount of coating and also slow in the release rate of copper.

Antifouling Test

A test plate was formed by spray coating 2 times each coating composition of Examples 28 to 54 and Comparative Examples 20 to 24 on both sides of a steel plate (100 mm long, 200 mm wide and 1 mm thick) previously coated with an anti-corrosive paint so as to make the coating thickness 100 μm on each side after dried, and naturally dried at room temperature overnight.

The resulting test plates were dipped in the seawater hanged from a raft placed in the Nakaminato harbor, Nakaminato-shi, Japan and subjected to observation of the organism (barnacle)-attaching area in the test plates with the lapse of time.

The results are shown in Tables 24 to 26.

TABLE 24

| Coating composition | Barnacle-attaching area (%) | | | | |
|---|---|---|---|---|---|
| | 0 month | 3 months | 6 months | 9 months | 12 months |
| Example 28 | 0 | 0 | 0 | 0 | 0 |
| Example 29 | 0 | 0 | 0 | 0 | 0 |
| Example 30 | 0 | 0 | 0 | 0 | 0 |
| Example 31 | 0 | 0 | 0 | 0 | 0 |
| Example 32 | 0 | 0 | 0 | 0 | 0 |
| Example 34 | 0 | 0 | 0 | 0 | 0 |
| Example 35 | 0 | 0 | 0 | 0 | 0 |
| Example 37 | 0 | 0 | 0 | 0 | 2 |
| Example 42 | 0 | 0 | 0 | 2 | 3 |
| Example 43 | 0 | 0 | 0 | 2 | 4 |

TABLE 25

| Coating composition | Barnacle-attaching area (%) | | | | |
|---|---|---|---|---|---|
| | 0 month | 3 months | 6 months | 9 months | 12 months |
| Example 46 | 0 | 0 | 0 | 0 | 0 |
| Example 47 | 0 | 0 | 0 | 0 | 0 |
| Example 48 | 0 | 0 | 0 | 0 | 0 |
| Example 49 | 0 | 0 | 0 | 0 | 0 |
| Example 50 | 0 | 0 | 0 | 0 | 0 |
| Example 51 | 0 | 0 | 0 | 0 | 0 |
| Example 52 | 0 | 0 | 0 | 0 | 0 |
| Example 53 | 0 | 0 | 0 | 0 | 0 |
| Example 54 | 0 | 0 | 0 | 0 | 0 |

TABLE 26

| Coating composition | Barnacle-attaching area (%) | | | | |
|---|---|---|---|---|---|
| | 0 month | 3 months | 6 months | 9 months | 12 months |
| Comparative Example 22 | 0 | 70 | 90 | 100 | 100 |
| Comparative Example 23 | 0 | 60 | 100 | 100 | 100 |
| Comparative Example 24 | 0 | 5 | 30 | 100 | 100 |

As is clear from Tables 24 to 26, the coating compositions of the present invention have excellent antifouling properties and the attachment of organisms are hardly observed.

As mentioned above, the coating varnish composition and the antifouling coating composition of the present invention do not show a danger derived from the organotin copolymers, but show good coating consuming properties and antifouling ability equal to the organotin copolymers, and able to form coatings capable of maintaining excellent antifouling properties for a long period of time, and not causing gelation when kneaded with a copper compound.

What is claimed is:

1. A coating varnish composition comprising
   (A) a polymer obtained by polymerizing 1 to 99% by mole of (a) one or more unsaturated carboxylic acids and 99 to 1% by mole of (b) one or more unsaturated monomers copolymerizable with the unsaturated carboxylic acids, and
   (B) at least one additive selected from the group consisting of triazole derivatives, thiadiazole derivatives and benzothiazole derivatives in an amount of 0.1 to 50% by weight based on the weight of the polymer (A).

2. A composition according to claim 1, wherein the unsaturated monomer (b) includes at least one compound of the formula:

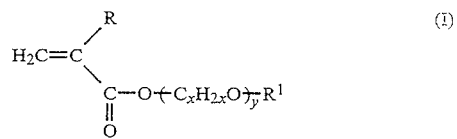

wherein R is a hydrogen atom or a methyl group; $x$ is an integer of 1 to 6; $y$ is an integer of 1 to 100; and $R^1$ is a hydrogen atom, a straight, branched or cyclic alkyl group, an aryl group or an aralkyl group.

3. A composition according to claim 2, wherein the polymer (A) is obtained by polymerizing 1 to 99% by mole of an unsaturated carboxylic acid, 0.1 to 20 by mole of an unsaturated monomer of the formula (I) and a balance comprising at least one unsaturated monomer other than that of the formula (I), total amount of monomers being 100% by mole.

4. A composition according to claim 2, wherein the polymer (A) is obtained by polymerizing 10 to 95% by mole of an unsaturated carboxylic acid, 0.2 to 15% by mole of an unsaturated monomer of the formula (I) and a balance comprising at least one unsaturated monomer other than that of the formula (I), total amount of monomers being 100% by mole.

5. A composition according to claim 1, wherein the component (B) is a triazole derivative.

6. A composition according to claim 5, wherein the triazole derivative is at least one member selected from the group consisting 1,2,3-benzotriazole, 3-amino-1H-1,2,4-triazole, and 1,2,4-triazole.

7. A composition according to claim 5, wherein the triazole derivative is 3-amino-1H-1,2,4-triazole, or 1,2,4-triazole.

8. A composition according to claim 1, which further comprises a solvent selected from the group consisting of alcohols, polyalkylene glycols and water.

9. An antifouling coating composition comprising
   (i) a coating varnish composition of claim 1, and
   (ii) 1 to 500% by weight, based on weight of total polymer solids, of an antifouling agent containing a copper compound in an amount of 50 to 100% by weight based on weight of the total antifouling agent.

10. A composition according to claim 9, wherein the copper compound is at least one member selected from the group consisting of cupric chromate, cupric ferrocyanate, cupric quinoline, cupric δ-hydroquinone, cupric oleate, cupric nitrate, cupric phosphate, cupric tartarate, cuprous oxide, copper rhodanide, copper-nickel solid solution alloy, cuprous iodide and cuprous sulfite.

11. A composition according to claim 9, wherein the antifouling agent comprises 50 to 100% by weight of a copper compound and 50% by weight or less of an organic antifouling agent or an inorganic antifouling agent other than a copper compound.

* * * * *